US008976801B2

(12) United States Patent
Roy

(10) Patent No.: US 8,976,801 B2
(45) Date of Patent: Mar. 10, 2015

(54) SHORT PACKET TRANSMISSION

(75) Inventor: Protip Roy, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 416 days.

(21) Appl. No.: 13/564,066

(22) Filed: Aug. 1, 2012

(65) Prior Publication Data

US 2014/0036928 A1 Feb. 6, 2014

(51) Int. Cl.
*H04L 12/28* (2006.01)
(52) U.S. Cl.
USPC .......................................... 370/412; 370/426
(58) Field of Classification Search
None
See application file for complete search history.

(56) References Cited

U.S. PATENT DOCUMENTS 7,830,919 B1 * 11/2010 Thompson ..................... 370/469
2006/0174251 A1 * 8/2006 Pope et al. ..................... 719/318

* cited by examiner

*Primary Examiner* — Andrew Lai
*Assistant Examiner* — Jamaal Henson
(74) *Attorney, Agent, or Firm* — Oblon, McClelland, Maier & Neustadt, L.L.P.

(57) ABSTRACT

Disclosed are various embodiments that provide short packet transmission by a network interface controller (NIC). The NIC may receive a signal indicating that a set of buffer descriptors is available for fetching from a host device. The NIC is configured to fetch the set of buffer descriptors from the host device, the set of buffer descriptors comprising a control flag, the control flag indicating whether the set of buffer descriptors comprises immediate packet data; and the NIC may transmit the immediate packet data as a transmit packet if the control flag indicates that the set of buffer descriptors comprises immediate packet data.

20 Claims, 5 Drawing Sheets

SHORT PACKET TRANSMISSION

BACKGROUND

A network interface controller (NIC) is responsible for fetching packet data from a host device and transmitting the packet data as a transmit packet to a remote computing device over a network. Thus, a NIC allows a host device to communicate with a remote device over the network. When the NIC fetches packet data from the host device, a delay may occur and the delay contributes to transmission latency. Reducing transmission latency allows for fast communication between the host device and a remote device.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to transmitting packets from a host device to a remote device via a network interface controller (NIC). When a host device is ready to transmit a packet, the host device stores the transmit packet in a host memory as packet data. It may be the case that the packet data is scattered throughout the host memory. That is to say, the packet data may be stored in segments of the host memory. These segments of packet data may correlate to disjointed memory addresses.

A host device may link these packet data segments using a set of buffer descriptors. A buffer descriptor, for example, may comprise a host address for locating a corresponding segment of packet data. To this end, a buffer descriptor identifiers where to find the packet data of a transmit packet to be transmitted by a NIC.

Various embodiments of the present disclosure are directed to structuring buffer descriptors based on the length of a transmit packet. One buffer descriptor scheme may be used for long packets while another buffer descriptor scheme may be used for short packets. For example, a host device may embed packet data directly into the buffer descriptor when a NIC is instructed to transmit a short packet. As another example, a host device can embed in a buffer descriptor a host memory address for locating packet data when the NIC is instructed to transmit a long packet.

Figure 1:
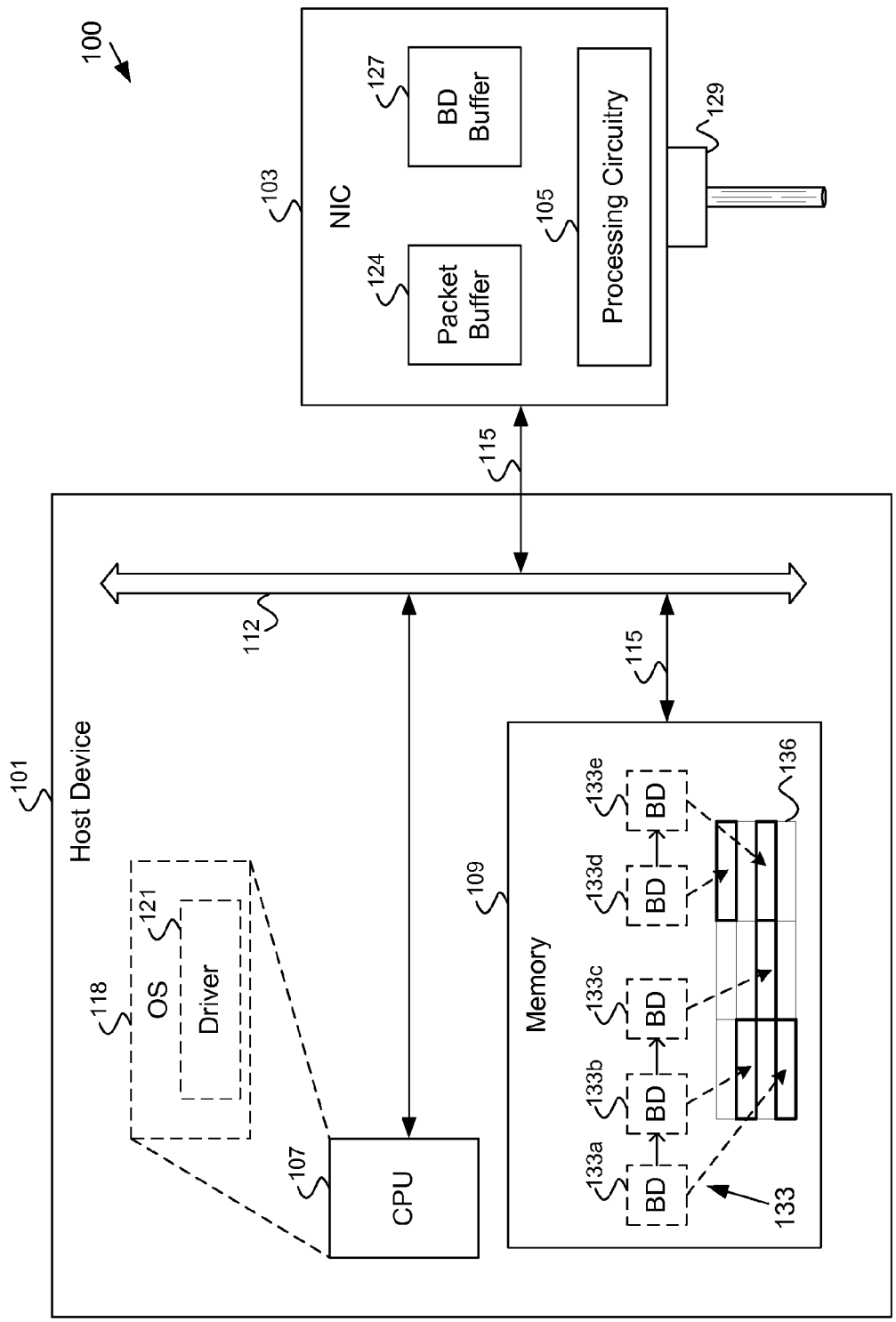
FIG. 1 is a drawing of a computing system according to various embodiments of the present disclosure.

With reference to FIG. 1, shown is a network component 100 according to various embodiments. The computing system 100 may correspond to a computing device such as a laptop computer, desktop computer, notepad, notebook, ultrabook, tablet, cellular device, or any other computing system configured to transmit packets over a network. The computing system 100 comprises a host device 101 and a network interface controller (NIC) 103. The host device 101 may be communicatively coupled to the NIC 103 via a bus 112. In various embodiments, the bus is a peripheral component interconnect (PCI) bus.

The host device 101 comprises a central processing unit (CPU) 107 and a host memory 109. An operating system OS 118 may be configured to be executed by the CPU 107. The OS 118 is software that manages the resources of the host device 101. The OS 118 may function as a platform for facilitating the execution of computer applications. Furthermore, the OS 118 may be configured to facilitate the execution of a device driver 121. The device driver 121 is configured to control the NIC 103. To this end, the device driver 121 allows for computer applications that are executed in the host device to use the NIC 103 for transmitting packets.

The host memory 109 comprises a memory array 136 for storing data. The memory array 136 comprises host memory addresses for locating and referencing any data stored in the memory array 136. That is to say, each piece of data stored in the memory array 136 of the host memory 109 may be located or otherwise referenced by a corresponding host memory address.

The host memory 109 also comprises one or more sets of buffer descriptors 133. A set of buffer descriptors 133 may comprise one or more individual buffer descriptors 133a-e. In the example of FIG. 1, one set of buffer descriptors 133 is made up of three individual buffer descriptors 133a-c and another set of buffer descriptors 133 is made up of two individual buffer descriptors 133d-e.

A single set of buffer descriptors 133 expresses a transmit packet. Thus, many transmit packets may be expressed by corresponding sets of buffer descriptors 133. A transmit packet is a packet subject to transmission by a NIC 103. A transmit packet is made up of packet data. Packet data may be stored at various addresses throughout the host memory 109. In other words, the packet data may be stored as segments where the collection of segments, as a whole, make up the packet data of a transmit packet. In one example, among others, some buffer descriptors 133a-e, comprise data that addresses a respective segment of packet data. That is to say, a buffer descriptor 133a-e may be embedded with a host memory address. In another non-limiting example, some buffer descriptors 133a-e are directly embedded with packet data instead of a host memory addresses. In various embodiments, determining how to structure a particular set of buffer descriptors depends on the length of the transmit packet.

In various embodiments, the sets of buffer descriptors 133 are implemented as a link-list with a leading buffer descriptor 133a, 133d of a particular set of buffer descriptors 133 as the head of the link-list. In other embodiments, the different sets of buffer descriptors 133 are organized as a ring structure or circular queue.

The NIC 103 comprises processing circuitry 105 for controlling the NIC 103. Additionally, the NIC comprises a packet buffer 124 as well as a buffer descriptor buffer 127. The NIC 103 also comprises a network port 129. The network port, for example, may be an Ethernet port. Transmit packets are ultimately transmitted through the network port 129.

In various embodiments, the processing circuitry 105 is implemented as at least a portion of a microprocessor. The processing circuitry 105 may include one or more circuits, one or more microprocessors, application specific integrated circuits, dedicated hardware, or any combination thereof. In yet other embodiments, processing circuitry 105 may include one or more software modules executable within one or more processing circuits. The processing circuitry 105 may further include memory configured to store instructions and/or code that causes the processing circuitry to execute data communication functions.

The processing circuitry 105 is configured to perform a direct memory access (DMA) via the bus 112 using a DMA path 115. The processing circuitry 105 facilitates fetching buffer descriptors 133*a-e* from the host memory using a DMA. Fetched buffer descriptors 133*a-e* may be stored in the buffer descriptor buffer 127 of the NIC 103. In some embodiments of the present disclosure, the data in fetched buffer descriptors 133*a-e* identifies one or more host memory addresses that locate packet data of a transmit packet. In this case, the processing circuitry 105 facilitates fetching the packet data based on the host memory addresses. Fetched packet data may be stored in the packet buffer 124 of the NIC 103. It may be the case that buffer descriptors 133*a-e* contain immediate packet data rather than host memory addresses. In this case, packet data need not be fetched because the packet data has effectively been fetched during the buffer descriptor fetch.

Next, a general description of the operation of the various components of the computer system 100 is provided. To begin, the OS 118 determines that a transmit packet must be transmitted from the host device 101 over a network. A device driver 121 facilitates the usage of the NIC 103 to send the transmit packet through the NIC 103. To prepare for sending the transmit packet, the OS 118 creates a copy of the transmit packet in the host memory 109. The transmit packet may be stored in a memory array 136 as disjointed packet data segments. Each packet data segment may be referenced by a unique host memory address.

Next, the device driver 121 creates a set of buffer descriptors 133 corresponding to the transmit packet stored in the memory array 136. The device driver 121 may structure the set of buffer descriptors 133 according to the length of the transmit packet. A short packet scheme is used to structure the set of buffer descriptors 133 when the transmit packet length falls below a predetermined threshold packet length. A long packet scheme is used to structure the set of buffer descriptors 133 when the transmit packet length exceeds a predetermined threshold packet length. Depending on the scheme, the NIC 103 performs one or more fetches. A fetch may be, for example, a DMA for retrieving a buffer descriptor 133*a -e* or for retrieving packet data referenced by a buffer descriptor 133*a-e*.

Each time the NIC 103, performs a DMA, a delay occurs while the host device 101 delivers the requested data to the NIC 103. If the number of fetches increases, the transmit latency increases. The transmit latency is the duration of time starting from the time when a host device 101 signals to the NIC 103 to transmit a particular transmit packet to when the first bit of data emanates from the NIC 103 over the network. As a non-limiting example, a NIC begins transmission after all the packet data is fetched. Thus, the transmit latency may be determined by the delay time caused by all the fetches performed by the NIC. By varying the buffer descriptor scheme based at least up on the transmit packet length, the transmit latency may be reduced. Various schemes for structuring buffer descriptors 133*a-e* are discussed in further detail below.

Figure 2:
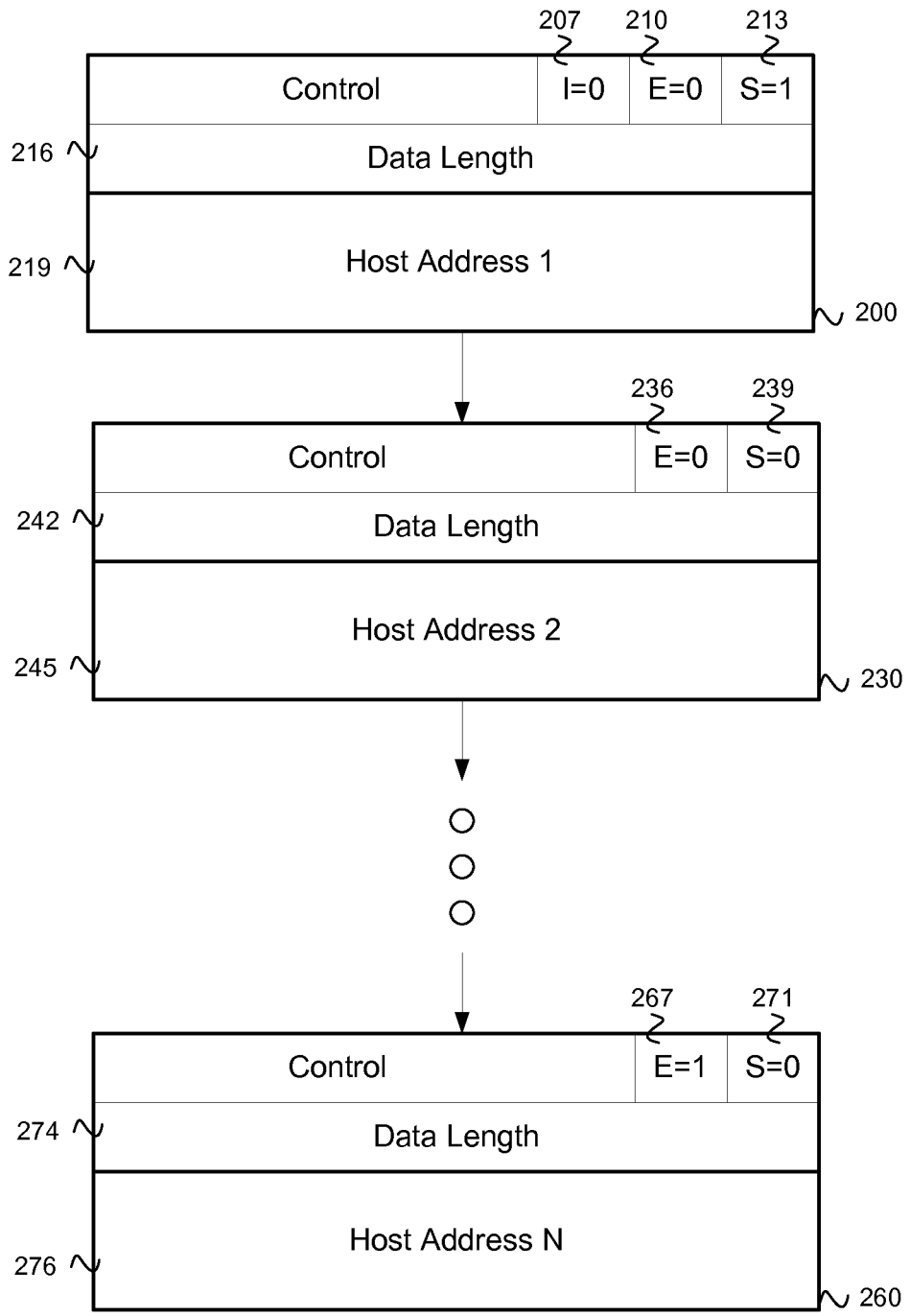
FIG. 2 is a drawing of an example of a set of buffer descriptors implemented within the computing system of FIG. 1 according to various embodiments of the present disclosure.

Turning now to FIG. 2, shown is a drawing of an example of a set of buffer descriptors 133 implemented within the computing system 100 of FIG. 1 according to various embodiments of the present disclosure. FIG. 2 provides a non-limiting example of a buffer descriptor scheme directed to transmitting a long packet.

The set of buffer descriptors 133 expresses one transmit packet to be sent by a NIC 103 (FIG. 1). The transmit packet comprises segments of packet data stored at various, disjointed memory locations within a host memory 109 (FIG. 1). For example, these memory locations may reference multiple host addresses 219, 245, 276. The set of buffer descriptors 133 of FIG. 2 may be managed by a device driver 121 (FIG. 1) executed in a host device 101 (FIG. 1). Furthermore, the set of buffer descriptors 133 may be stored in the host memory 109 along with the packet data of the transmit packet. The device driver 121 is configured to send to the NIC 103, a signal indicating that the set of buffer descriptors 133 is available for fetching from the host device 101.

When the NIC 103 receives a signal that the set of buffer descriptors 133 is ready to be fetched, the NIC 103 is configured to perform a DMA to fetch the set of buffer descriptors 133. To this end, processing circuitry 105 (FIG. 1) in the NIC 103 facilitates a DMA to fetch the set of buffer descriptors 133 and store the set of buffer descriptors 133 in a buffer descriptor buffer 127 (FIG. 1) of the NIC 103. In various embodiments, the NIC 103 is configured to fetch a plurality of buffer descriptors 133*a-e* as a single DMA step.

The example of FIG. 2 depicts a buffer descriptor scheme where the set of buffer descriptors 133 forms a sequential chain of a plurality of individual buffer descriptors 200, 230, 260. In various embodiments, the first buffer descriptor 200 in the set of buffer descriptors 133 is the head of a link list of buffer descriptors 200, 230, 260. The second buffer descriptor 230 is in the middle of the link list and a third buffer descriptor 260 is at the tail of the link list. Although only three buffer descriptors are depicted in FIG. 2, any number of buffer descriptors 200, 230, 260 may be used to express the transmit packet.

The first buffer descriptor 200 comprises control data and a host address 219. The host address 219 specifies a location of where a segment of packet data may be found in the host memory 109. To this end, the host address is an identifier for a packet data segment. Thus, the first buffer descriptor 200 identifies where to find at least a segment of packet data. The first buffer descriptor 200 does not comprise any packet data.

The control data of the first buffer descriptor 200 comprises an immediate packet data control flag 207, an end flag 210, a start flag 213, a data length 216, and any other control data for handling the first buffer descriptor 200. The start flag 213 specifies whether a buffer descriptor is sequentially the first buffer descriptor in a set of buffer descriptors 133. Because the first buffer descriptor 200 is sequentially the first buffer descriptor in the set of buffer descriptors 133, the start flag 213 is set. When the NIC 103 fetches the first buffer descriptor 200, the start flag 213 specifies that the packet data referenced by the host address 219 is sequentially the first segment of packet data of the transmit packet expressed by the set of buffer descriptors 133 of FIG. 2. Similarly, the end flag 210 of the first buffer descriptor 200 specifies whether the first buffer descriptor 200 is sequential last in the set of buffer descriptors 200. In the example of FIG. 2, the end flag 210 is not set.

The data length 216 of the first buffer descriptor 200 indicates the length of the packet data segment associated with the host address 219. In various embodiments, the host address 219 is the start address associated with the location of a corresponding packet data segment. The data length 216 specifies how much data to fetch beyond the start address. Thus, when performing a packet data fetch, the processing circuitry 105 of the NIC 103 has enough information to fetch the appropriate data from the host memory 109 using a DMA procedure.

The immediate packet data control flag 207 identifies the buffer descriptor scheme employed by the set of buffer descriptors 133. One buffer descriptor scheme embeds host addresses 219, 245, 276 in the set of buffer descriptors to reference corresponding packet data segments. Another buffer descriptor scheme embeds packet data segments immediately into the buffer descriptors. Thus, the immediate packet data control flag 207 indicates which scheme is used. In various embodiments, a binary value is used to select one scheme over another scheme. In the example of FIG. 2, the set of buffer descriptors employs a scheme of embedding host addresses 219, 245, 276. Accordingly, the immediate packet data control flag 207 is not set or otherwise disabled. Although the example of FIG. 2 depicts setting a flag using a binary "1," embodiments of the present disclosure are not limited to this format.

In various embodiments, only the first buffer descriptor as the head of a set of buffer descriptors comprises the immediate packet data control flag 207. For example, the immediate packet data control flag 207 applies to all the buffer descriptors 200, 230, 260 in the set of buffer descriptors 133.

The second buffer descriptor 230 also comprises control data and a host address 245. The host address 245 specifies a location of another packet data segment may be found in the host memory 109. The second buffer descriptor 230 does not comprise any packet data.

The control data of the second buffer descriptor 230 comprises an end flag 236, a start flag 239, a data length 242, and any other control data for handling the second buffer descriptor 230. In the example of FIG. 2, the second buffer descriptor 230 represents a buffer descriptor found in the middle of a chain of sequential buffer descriptors. Accordingly, neither the start flag 239 not the end flag 236 is set. This indicates to the NIC 103 that additional buffer descriptors 260 sequentially remain in the set of buffer descriptors 133. Furthermore, the data length 242 of the second buffer descriptor 230 indicates the length of the packet data segment associated with the host address 245.

The third buffer descriptor 260 comprises also control data and a host address 276. The host address 276 specifies a location of another packet data segment may be found in the host memory 109. The third buffer descriptor 260 does not comprise any packet data.

The control data of the third buffer descriptor 260 comprises an end flag 267, a start flag 271, a data length 274, and any other control data for handling the second buffer descriptor 260. The data length 274 of the third buffer descriptor 260 indicates the length of the packet data segment associated with the host address 276.

In the example of FIG. 2, the third buffer descriptor 260 represents a buffer descriptor at the tail a chain of sequential buffer descriptors. Accordingly, the end flag 236 is set. This indicates to the NIC 103 that the packet data segment referenced by the third buffer descriptor 260 is sequentially the last piece of data in the transmit packet expressed by the set of buffer descriptors 133. Additionally, setting the end flag 267 indicates to the NIC 103 that the next buffer descriptor in a queue is associated with the next transmit packet.

In various embodiments, the processing circuitry 105 facilitates performing a DMA to fetch the set of buffer descriptors 133 of FIG. 2. The processing circuitry 105 extracts the various host addresses 219, 245, 276 and then performs a subsequent DMA to fetch the corresponding segments referenced by the respective host addresses 219, 245, 276. Thus, as seen in the example of FIG. 2, at least two fetch steps are required to retrieve the packet data of the transmit packet.

The processing circuitry 105 stores the fetched data packet segments in a packet buffer 124 (FIG. 1) in the NIC 103. In various embodiments, the processing circuitry 105 concatenates each of the fetched packet data segments in a sequence that corresponds to the sequence of the buffer descriptors 200, 230, 260 within the set of buffer descriptors 133 of FIG. 2. To this end, the processing circuitry 105 of the NIC 103 fetches and assembles packet data. The NIC 103 may then transmit the packet data as a transmit packet.

In various embodiments, each of the buffer descriptors 200, 230, 260 of FIG. 2 are a fixed in terms of length. Although each of the buffer descriptors 200, 230, 260 are fixed in length, each buffer descriptor 200, 230, 260 may reference a respective packet data segment at varied lengths. That is to say, the packet data lengths 216, 242, 274 referenced by the various buffer descriptors 200, 230, 260, may be different lengths.

Figure 3:
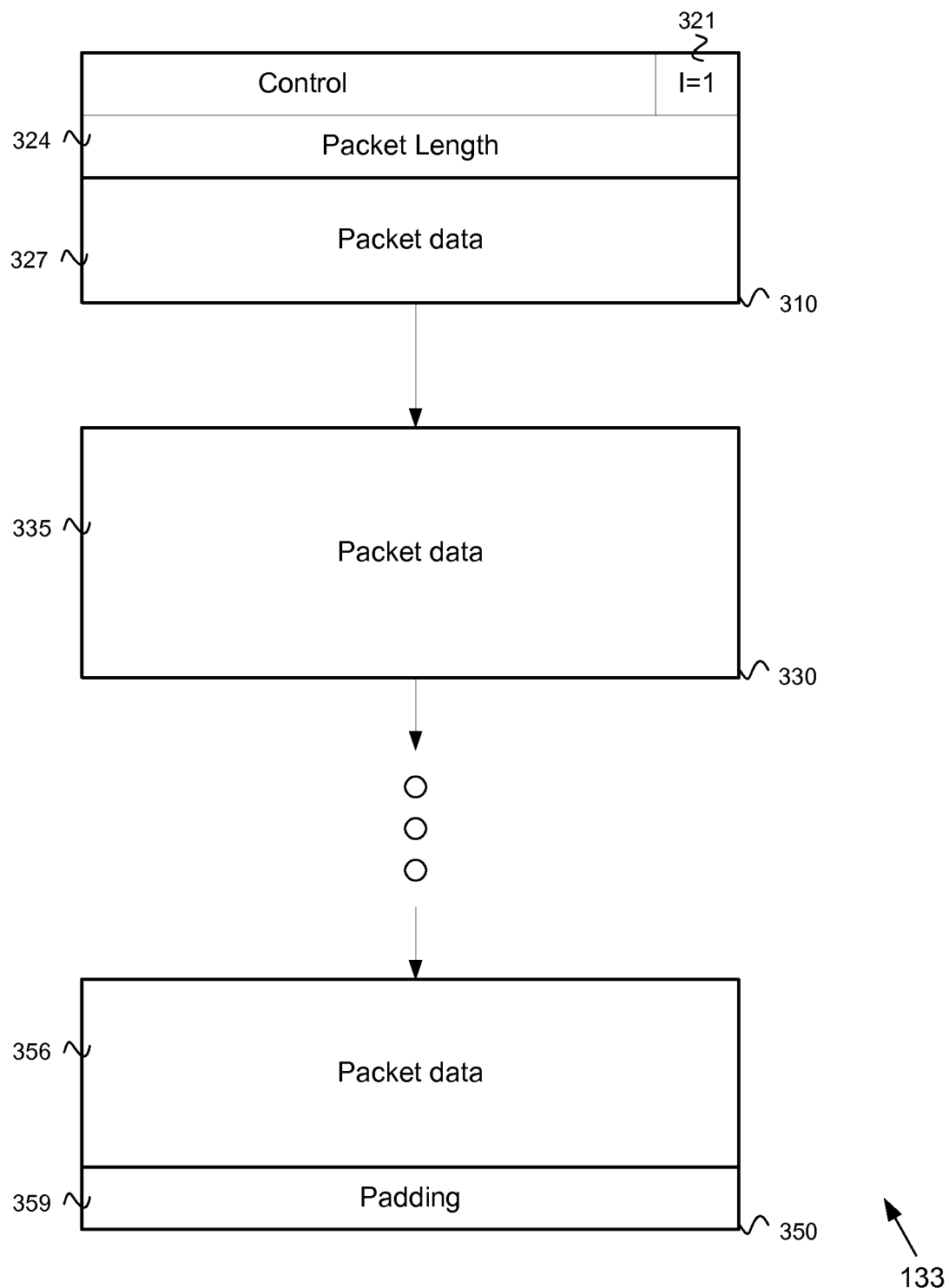
FIG. 3 is a drawing of an example of a set of buffer descriptors implemented within the computing system of FIG. 1 according to various embodiments of the present disclosure.

Moving to FIG. 3, shown is a drawing of an example of a set of buffer descriptors 133 implemented within the computing system 100 of FIG. 1 according to various embodiments of the present disclosure. FIG. 3 provides a non-limiting example of a buffer descriptor scheme directed to transmitting a short packet.

The set of buffer descriptors 133 expresses one transmit packet to be sent by a NIC 103 (FIG. 1). The transmit packet comprises segments of packet data stored at various, disjointed memory locations within a host memory 109 (FIG. 1). The set of buffer descriptors 133 of FIG. 3 may be generated by a device driver 121 (FIG. 1) executed in a host device 101 (FIG. 1). Furthermore, the set of buffer descriptors 133 may be stored in the host memory 109 along with the packet data of the transmit packet. The device driver 121 is configured to send to the NIC 103, a signal indicating that the set of buffer descriptors 133 is available for fetching from the host device 101.

When the NIC 103 receives a signal that the set of buffer descriptors 133 is ready to be fetched, the NIC 103 is configured to perform a DMA to fetch the set of buffer descriptors 133. To this end, processing circuitry 105 (FIG. 1) in the NIC 103 facilitates a DMA to fetch the set of buffer descriptors 133.

The example of FIG. 3 depicts a buffer descriptor scheme where the set of buffer descriptors 133 forms a sequential chain of a plurality of individual buffer descriptors 310, 330, 350. In various embodiments, the first buffer descriptor 310 in the set of buffer descriptors 133 is the head of a link list of buffer descriptors 310, 330, 350. The second buffer descriptor 330 is in the middle of the link list and a third buffer descriptor 350 is at the tail of the link list. Although only three buffer descriptors are depicted in FIG. 3, any number of buffer descriptors 310, 330, 350 may be used to express the transmit packet.

The first buffer descriptor 310 comprises control data and packet data. The device driver 121 may locate a packet data segment 327 and embed it into the first buffer descriptor 310. To this end, the packet data 327 in the first buffer descriptor is immediately available for transmission once the NIC 103 performs a DMA to retrieve the set of buffer descriptors 133. In this sense, the NIC 103 does not need to perform subsequent DMA procedures to retrieve packet data. Thus the first buffer descriptor 310 does not contain any host memory addresses.

The control data of the first buffer descriptor 200 comprises an immediate packet data control flag 321, a packet length 324, and any other control data for handling the first buffer descriptor 310. The immediate packet data control flag 321 identifies the buffer descriptor scheme employed by the set of buffer descriptors 133. In the example of FIG. 3, the immediate packet data control flag 321 indicates that the set of buffer descriptors 133 employs a scheme of embedding immediate packet data into the set of buffer descriptors 133. Accordingly, the immediate packet data control flag 321 is set or otherwise enabled. Although the example of FIG. 3 depicts setting a flag using a binary "1," embodiments of the present disclosure are not limited to this format.

In various embodiments, only the first buffer descriptor 310, as the head of a set of buffer descriptors 133, comprises the immediate packet data control flag 321. For example, the immediate packet data control flag 321 applies to all the buffer descriptors 310, 330, 350 in the set of buffer descriptors 133.

The packet length 324 of the first buffer descriptor 310 specifies the length of the packet data of the transmit packet. In various embodiments, the length of the packet data regards the total length of the transmit packet. The packet data segments that make up the transmit packet may be associated with respective buffer descriptors 310, 330, 350. Aggregating each packet data segment results in a transmit packet, such that the packet length 324 of the first buffer descriptor 310 regards to the transmit packet length.

The packet length 324 implicitly demarks a start and stop point such that the processing circuitry 105 may determine the last buffer descriptor 350 in the set of buffer descriptors 133. In various embodiments, the first packet descriptor 310 excludes a start flag and stop flag. When the immediate packet data control flag 321 of the first buffer descriptor 310 specifies that the set of buffer descriptors 133 comprises immediate packet data, the processing circuitry 105 can process the remainder of the set buffer descriptor 133 according to the packet length 324 without relying on a start flag and stop flag.

The second buffer descriptor 330 comprises packet data 335. In various embodiments, the second buffer descriptor 330 comprises only packet data 335. That is to say, the second buffer descriptor 300 excludes control data. This may lead to an efficient use of space reserved for a particular buffer descriptor 330. When the processing circuitry 105 of NIC 103 identifies that the immediate packet data control flag 321 of the first buffer descriptor 310 is set, the processing circuitry may be configured to handle subsequent buffer descriptors 330, 350 as solely being made up of packet data.

The third buffer descriptor 350 comprises packet data 356. The third buffer descriptor 350 of FIG. 3 provides a non-limiting example of the last buffer descriptor in a sequential chain of buffer descriptors 133 that expresses one transmit packet. Accordingly, the packet data 356 of the third buffer descriptor 350 is sequentially the last series of bits in a transmit packet.

In various embodiments, the third buffer descriptor 350 comprises padding 359. The third buffer descriptor 350 may be padded with bits to fill the remainder of the buffer descriptor data structure when the length of the remaining packet data 356 is less than the length of the buffer descriptor 350.

In various embodiments, the processing circuitry 105 facilitates performing a DMA to fetch the set of buffer descriptors 133 of FIG. 3. The processing circuitry 105 identifies that the immediate packet data control flag 321 of the first buffer descriptor 310 of the set of buffer descriptors 133 is set. This indicates to the NIC 103 that the set of buffer descriptors 133 of FIG. 3 includes immediate packet data 327, 335, 356. This also indicates to the NIC 103 that no additional fetches are required to retrieve the transmit packet. The processing circuitry 105 of the NIC 103 assembles the packet data 327, 335, 356 to create a complete transmit packet. The processing circuitry 105 assembles the packet data 327, 335, 356 based at least upon the order of the buffer descriptors 310, 330, 350 and the packet length 324. The NIC 103 may then send the transmit packet over a network. The NIC 103 may then proceed to process the next set of buffer descriptors for transmitting the next transmit packet.

In various embodiments, the length of each buffer descriptor 310, 330, 350 in the set of buffer descriptors 133 is fixed. Although the length of each buffer descriptor 310, 330, 350 has the same, fixed length, the transmit packet expressed by the set of buffer descriptors 133 may vary in length. In order to handle variable length packets, the device driver 121 determines an appropriate number of buffer descriptors to express the transmit packet. As a non-limiting example, more buffer descriptors that make up a set of buffer descriptors 133 may be required for longer packet lengths, to the extent that a buffer descriptor scheme that embeds packet data directly into the buffer descriptors 310, 330, 350 is being utilized.

Figure 4:
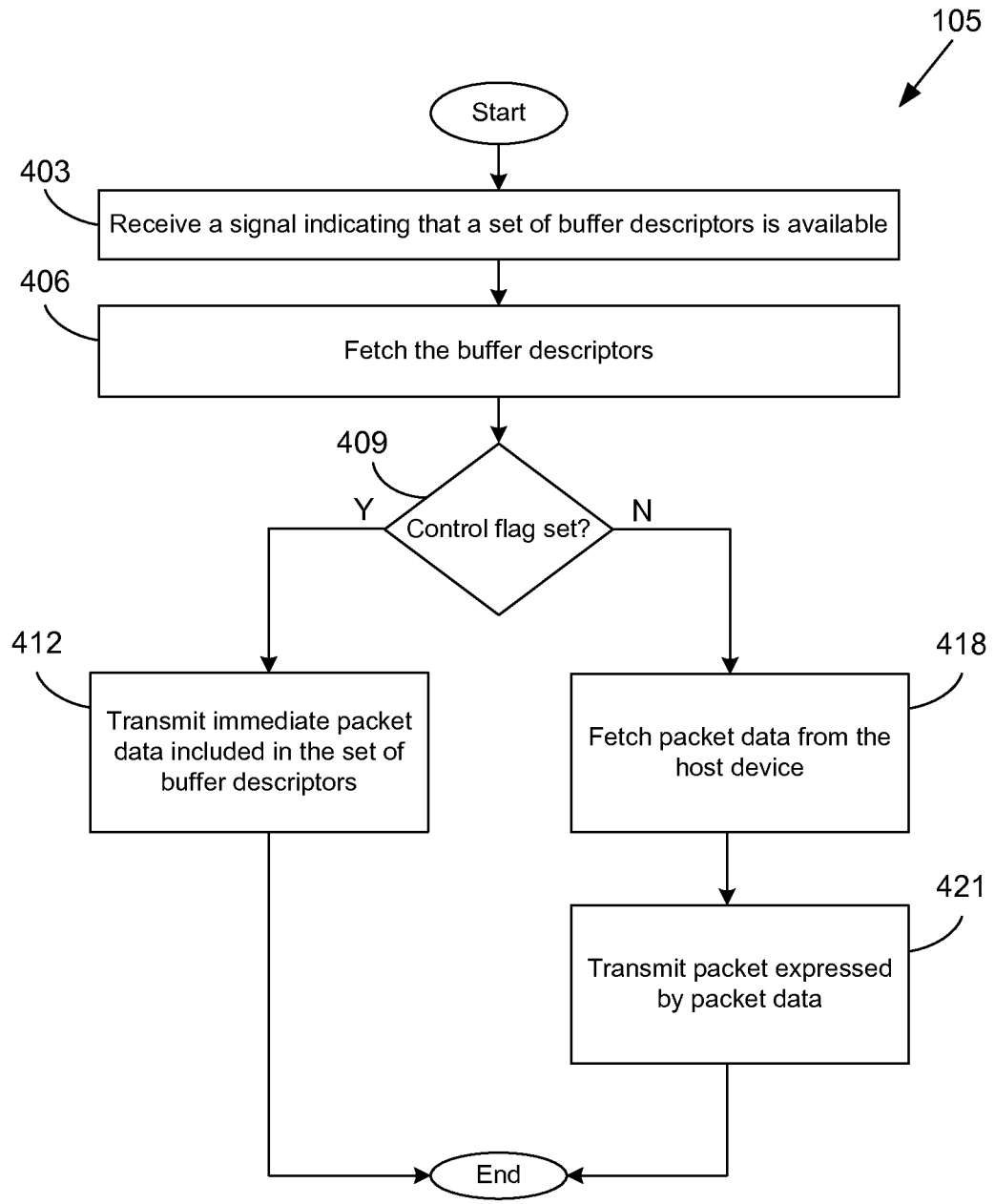
FIG. 4 is a flowchart illustrating one example of functionality implemented as portions of processing circuitry in a network interface controller of the computing system of FIG. 1 according to various embodiments of the present disclosure.

Turning now to FIG. 4, shown is a flowchart illustrating one example of functionality implemented as portions of processing circuitry 105 in a NIC 103 (FIG. 1) of the computing system 100 of FIG. 1 according to various embodiments of the present disclosure. It is understood that the flowchart of FIG. 4 provides merely an example of the many different types of functional arrangements that may be employed to implement the operation of the portion of the logic executed by the processing circuitry 105 as described herein. As an alternative, the flowchart of FIG. 4 may be viewed as depicting an example of steps of a method implemented in the processing circuitry 105 according to one or more embodiments.

Beginning with reference number 403, the processing circuitry 105 receives a signal indicating that a set of buffer descriptors 133 (FIG. 1) is available to be fetched from a host device 101 (FIG. 1). The set of buffer descriptors 133 may reside in a host memory 109 (FIG. 1) in the host device 101. In various embodiments, the processing circuitry 105 is communicatively coupled to the host device by way of a bus. The bus, for example, may be a peripheral component interconnect (PCI) bus, any variation of a PCI bus, such as a PCI-Express bus, InfiniBand bus, or any other bus for communicatively coupling a NIC to a host device.

At reference number 406, the processing circuitry facilitates fetching the set of buffer descriptors 133 from the host device 101. The set of buffer descriptors 133 may employ a buffer descriptor scheme as depicted in the example of FIG. 2 or the set of buffer descriptors 133 may employ a buffer descriptor scheme as depicted in the example of FIG. 3. In either case, the set up buffer descriptors comprises a series of sequentially ordered individual buffer descriptors. Furthermore, in either case, the first buffer descriptor includes a control flag that indicates whether the set of buffer descriptors 133 comprises immediate packet data or host memory addresses.

As seen at reference number 409, if the control flag indicates that the set of buffer descriptors 133 comprises immediate packet data, then the processing circuitry 105 branches to reference number 412. In this case, the set of buffer descriptors may employ a buffer descriptor scheme depicted in the non-limiting example of FIG. 3. At reference number 412, the processing circuitry 105 facilitates transmitting the immediate packet data included in the set of buffer descriptors. That is to say, the NIC 103 assembles the immediate packet data to generate a transmit packet and then transmits the transmit packet. In various embodiments, the processing circuitry 105 of the NIC 103 converts the immediate packet data of the various buffer descriptors in the set of buffer descriptors 133 into a string of bits and transmits the string of bits over a network.

However, if the control flag indicates that the set of buffer descriptors 133 comprises host memory addresses, as seen at reference number 409, then the processing circuitry 105 branches to reference number 418. In this case, the set of buffer descriptors may employ a buffer descriptor scheme depicted in the non-limiting example of FIG. 2. At reference number 418, the processing circuitry 105 identifies the host memory addresses specified in the set of buffer descriptors 133 and performs one or more DMA procedures to fetch the packet data segments identified by corresponding host memory addresses. The fetched packet data segments may be stored in a packet buffer 124 (FIG. 1) in the NIC 103.

At reference number 421, the processing circuitry facilitates transmitting the transmit packet expresses by the packet data segments. In various embodiments, the processing circuitry 105 of the NIC 103 converts the packet data segments of the set of buffer descriptors 133 into a string of bits and transmits the string of bits over a network.

Figure 5:
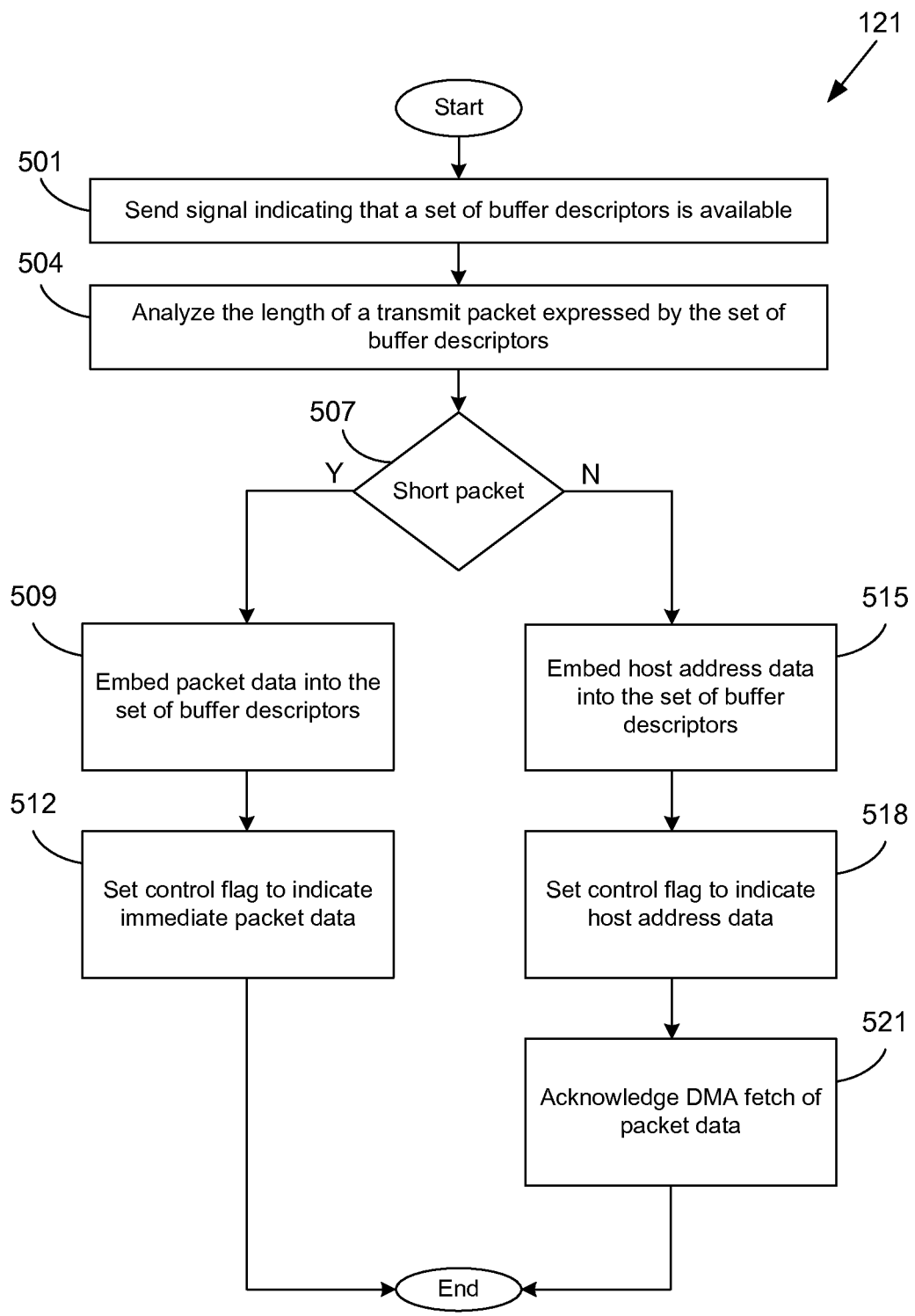
FIG. 5 is a flowchart illustrating one example of functionality implemented as portions of a device driver in a host device of the computing system of FIG. 1 according to various embodiments of the present disclosure.

Turning now to FIG. 5, shown is a flowchart illustrating one example of functionality implemented as portions of a device driver 121 executed by a CPU 107 (FIG. 1) in a host device 101 (FIG. 1) of the computing system 100 of FIG. 1 according to various embodiments of the present disclosure. It is understood that the flowchart of FIG. 5 provides merely an example of the many different types of functional arrangements that may be employed to implement the operation of the portion of the logic executed by the CPU 107 as described herein. As an alternative, the flowchart of FIG.5 may be viewed as depicting an example of steps of a method implemented by the device driver 121 being executed by a CPU 107 according to one or more embodiments.

Beginning at reference number 501, the device driver 121 facilitates sending a signal to a NIC 103 (FIG. 1) indicating that a set of buffer descriptors 133 (FIG. 1) is available. The device driver 121 is executed by a CPU 107 in a host device 101. The host device may be communicatively coupled to the NIC 103 via a bus. When the NIC 103 receives the signal, the NIC 103 may fetch the set of buffer descriptors. Accordingly, the device driver 121 must prepare the set of buffer descriptors 133 before the NIC 103 executes the buffer descriptor fetch.

In preparing the set of buffer descriptors, as seen at reference number 504, the device driver 121 analyzes the length of a transmit packet expressed by the set of buffer descriptors 133. To this end, the device driver 121 determines whether to embed packet data of the transmit packet into the set of buffer descriptors 133 based at least upon a length of the transmit packet and a predetermined threshold packet length. For example, if the predetermined threshold packet length is 128 bytes, then the device driver 121 may choose to embed packet data directly into the buffer descriptors 133 when the packet length of the transmit packet is less than 128 bytes.

Next, at reference number 507, if the set of buffer descriptors 133 expresses a transmit packet that is a short packet, then the device driver 121 branches to reference number 509. For example, the transmit packet may be deemed a short packet when the length of the transmit packet falls below a predetermined threshold packet length. If this is the case, then the device driver 121 may employ a buffer descriptor scheme as seen in the non-limiting example of FIG. 3.

At reference number 509, the device driver 121 embeds packet data into the set of buffer descriptors 133. The device driver 121 may copy packet data in a host memory 109 (FIG. 1) directly in the set of buffer descriptors 133 that is subject to being fetched by a NIC 103. Thus, the set of buffer descriptors 133 comprises immediate packet data. Additionally, as seen at reference number 512, the device driver 121 sets a control flag 321 (FIG. 3) to indicate that the transmit packet has been embedded in the set of buffer descriptors.

However, at reference number 507, if the set of buffer descriptors 133 expresses a transmit packet that is not a short packet, then the device driver 121 branches to reference number 515. For example, the transmit packet may be deemed a long packet when the length of the transmit packet exceeds a predetermined threshold packet length. If this is the case, then the device driver 121 may employ a buffer descriptor scheme as seen in the non-limiting example of FIG. 2.

At reference number 515, the device driver 121 embeds host memory addresses data into the set of buffer descriptors 133. The device driver 121 may reference a memory array 136 (FIG. 1) of the host memory 109 to identify the locations of the packet data scattered throughout the memory array 136. Thus, the set of buffer descriptors 133 comprises host memory address data. Additionally, as seen at reference number 518, the device driver 121 sets a control flag 321 (FIG. 3) accordingly to indicate that the set of buffer descriptors 133 comprises host memory address data.

When device driver 121 does not embed immediate packet data in the set of buffer descriptors 133 and instead, embeds host memory addresses to locate packet data, the NIC 103 may fetch the packet data based on the host memory addresses included in the set of buffer descriptors 133. At reference number 521, the device driver 121 acknowledges a DMA fetch of the packet data. That is to say, the device driver 121 is made aware that the NIC has fetched the set of buffer descriptors and has separately fetched the packet data described by the buffer descriptors.

The processing circuitry 105, device driver 121 executed in the CPU 107, and other various systems described herein may be embodied in software or code executed by general purpose hardware. As an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4 and 5 show the functionality and operation of an implementation of portions of the processing circuitry 105 and device driver 121 implemented by the network component 100 (FIG. 1). If embodied in software, each block indicated by a reference number may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block indicated by a reference number may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the processing circuitry 105, the OS 118, and the device driver 121, that comprise software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A method comprising:
    sending, from a host device to a network interface controller (NIC), a signal indicating that a set of buffer descriptors is available for fetching from the host device, the set of buffer descriptors expressing a transmit packet;
    determining whether to embed packet data of the transmit packet into the set of buffer descriptors based at least upon a length of the transmit packet and a predetermined threshold packet length; and
    setting a control flag of the set of buffer descriptors to a first value to indicate that packet data of the transmit packet has been embedded in the set of buffer descriptors.

2. The method of claim 1, wherein the NIC is communicatively coupled to the host device via a bus, the bus being selected from a group consisting of a peripheral component interconnect (PCI) bus, a PCI-Express bus, and an InfiniBand bus.

3. The method of claim 1, wherein the set of buffer descriptors comprises a first buffer descriptor, the control flag being included within the first buffer descriptor.

4. The method of claim 3, wherein the first buffer descriptor comprises data indicating a packet length for the transmit packet embedded in the set of buffer descriptors.

5. The method of claim 3, wherein the set of buffer descriptors comprises a second buffer descriptor, the second buffer descriptor comprising only a portion of the packet data of the transmit packet, wherein the second buffer descriptor sequentially follows the first buffer descriptor.

6. The method of claim 5, wherein the set of buffer descriptors comprises a third buffer descriptor, the third buffer descriptor comprising a remainder of the packet data of the transmit packet and padding, wherein the third buffer descriptor sequentially follows the second buffer descriptor.

7. The method of claim 1, wherein the transmit packet is configured to vary in length.

8. The method of claim 1, further comprising refraining from setting the control flag of the set of buffer descriptors when the length of the transmit packet exceeds the predetermined threshold packet length, wherein refraining from setting the control flag indicates that the set of buffer descriptors comprises host address data for locating the packet data of the transmit packet.

9. A system comprising:
    a host device comprising a host memory, the host memory configured to store a set of buffer descriptors that express a transmit packet;
    a NIC that is communicatively coupled to the host device via a bus, the NIC being configured to perform a direct memory access of the host memory to fetch the set of buffer descriptors; and
    a device driver that is executable by the host device, the device driver being configured to determine whether to embed packet data of the transmit packet into the set of buffer descriptors based at least upon a length of the transmit packet and a predetermined threshold packet length, the device driver being further configured to set a control flag of the set of buffer descriptors to a first value to indicate that the packet data of the transmit packet has been embedded in the set of buffer descriptors.

10. The system of claim 9, wherein the device driver embeds packet data of the transmit packet into the set of buffer descriptors when the length of the transmit packet falls below the predetermined threshold packet length.

11. The system of claim 9, wherein the device driver embeds host address data into the set of buffer descriptors when the length of the transmit packet exceeds the predetermined threshold packet length.

12. The system of claim 11, wherein the host address data identifies a location in the host memory of the packet data of the transmit packet.

13. The system of claim 12, wherein the NIC is further configured to fetch the packet data based at least upon the host address data.

14. The system of claim 9, wherein the transmit packet is configured to vary in length.

15. A method comprising:
receiving, in a network interface controller (NIC), a signal, the signal indicating that a set of buffer descriptors is available for fetching from a host device;
fetching, in the NIC, the set of buffer descriptors from the host device, the set of buffer descriptors comprising a control flag, the control flag indicating whether the set of buffer descriptors comprises immediate packet data; and
transmitting the immediate packet data as a transmit packet if the control flag indicates that the set of buffer descriptors comprises immediate packet data.

16. The method of claim 15, wherein the control flag further indicates whether the set of buffer descriptors comprises host memory address data for locating packet data of the transmit packet;
the method further comprising fetching the packet data from the host device based at least in part upon the host memory address data if the control flag indicates that the set of buffer descriptors comprises host memory address data for locating the packet data.

17. The method of claim 15, wherein the NIC comprises a first memory buffer for storing the set of buffer descriptors and a second memory buffer for storing the transmit packet.

18. The method of claim 15, wherein the set of buffer descriptors comprises a first buffer descriptor, the control flag being included within the first buffer descriptor.

19. The method of claim 18, wherein the set of buffer descriptors comprises a second buffer descriptor, the second buffer descriptor comprising a portion of the immediate packet data when the control flag indicates that the set of buffer descriptors comprises immediate packet data, wherein the second buffer descriptor sequentially follows the first buffer descriptor.

20. The method of claim 19, wherein the second buffer descriptor excludes control data when the control flag indicates that the set of buffer descriptors comprises immediate packet data.

* * * * *